Patented Apr. 2, 1940

2,196,152

UNITED STATES PATENT OFFICE 2,196,152

DENATURANT

Hamline M. Kvalnes, Wilmington, Del., assignor to E. I. du Pont de Nemours & Company, Wilmington, Del., a corporation of Delaware No Drawing. Application December 14, 1937, Serial No. 179,667

4 Claims. (Cl. 202—77)

This invention relates to denaturants and more particularly to denatured alcohols and the method of denaturing them.

Many proposals have been made in the past for the use of various materials which, when mixed with a substance such as an alcohol, or ester, completely change its taste or odor or both so that it cannot be diverted from its intended use or cannot readily be identified or both. For example, this procedure has been applied to methanol to avoid its being taken internally, as well as to ethanol and other alcohols which might otherwise be diverted from their intended commercial use to that of a beverage. Similarly, substances such as ethyl acetate, and other esters, which might fairly easily be otherwise converted to alcohols and thus diverted from their intended use, have likewise been denatured. Upon chemical treatment of such esters, the denaturant has been intended to carry over to the alcohol and cause it to be unpotable.

Materials which have been proposed as denaturants before have had one or more characteristics which adapt them for denaturing purposes. There are, however, several special features which it is desirable to have in a denaturant and all of which have not been possessed to a sufficient degree by many of the denaturants previously suggested. Thus, for example, it is desirable that a denaturant have an obnoxious taste and a distinctive odor. Substances have been proposed previously which possess disagreeable tastes but the odor carried by the denaturant has often been of such a character as to make the final denatured alcohol commercially undesirable.

Another characteristic which a denaturant must possess is that of difficulty of removal from the denatured medium. As rapidly as denaturants have been proposed. methods have been discovered for their removal from the denatured medium. The methods utilized for removal of denaturants have been usually chemical treatment of the denatured medium combined with or followed by various distillation steps and further chemical treatment until, finally, relatively pure alcohol has been obtained.

It is an object of the present invention to overcome the disadvantages of the prior art and to provide a new and improved denaturant and denatured materials.

It is a further object of the present invention to provide a denatured ethyl alcohol which possesses a distinctive but unobjectionable odor, and a taste which renders the ethyl alcohol unpotable.

Other objects and advantages of the present invention will be apparent by reference to the following specification in which the preferred embodiments and details are set forth.

According to the present invention a denatured material from which it is extremely difficult if not impossible to remove the denaturant is prepared by mixing with liquid materials such as gasoline, an ester such as ethyl acetate, an alcohol, including such alcohols as methyl, ethyl, and propyl and the like, relatively small quantities of a liquid oxygenated alicyclic compound containing only the elements carbon, hydrogen, and oxygen, boiling in the range of from 50 to 200° C.

The denaturants of this invention are generally applicable for treatment of any normally liquid material which it is desired to denature although, preferably, the material to be denatured should have a boiling point in the range of 30° C. to 250° C. From a material having a boiling point in this range it will be found extremely difficult, if not impossible, to remove my denaturant.

My denaturants are also adapted to and effective in denaturing and distinguishing motor fuels from one another in cases, for example, where it is desired to identify and keep separate individual supplies or stocks of gasoline. Specifically, my denaturants are highly effective as a means of marking or giving a distinctive odor to tax-free gasoline.

A wide range of alcohols may also be successfully denatured or distinguished from one another according to this invention, such, for example, as methyl alcohol. ethyl alcohol, butyl alcohol, isobutyl alcohol, isopropyl alcohol, and others. Similarly, a large number of esters may be successfully denatured or distinguished from one another, substantially the only requisites being that the ester should have a boiling point in the range above indicated and, further, the ester should be one which might be fairly easily transformed into an alcohol. Thus, for example, in addition to denaturing ethyl esters such as ethyl acetate mentioned before, the denaturants of this invention may be utilized with other esters such as methyl, propyl, isopropyl, butyl and isobutyl acetates and the like or similarly with like formates, propionates, butyrates, isobutyrates and like esters.

These oxygenated alicyclic compounds of this invention possess characteristic odors and are unpotable because of odor and taste. Both the odor and the taste persist in spite of drastic treatment utilized for their removal.

The following examples illustrate proportions of various materials which may be utilized as denaturants. It will be noted that small quantities only of the denaturant are necessary for denaturing purposes and that the material remaining after treatment for denaturant removal possesses an undesirable taste and a distinctive odor.

Example 1

An unpotable ethyl alcohol was prepared by adding 0.2 volume of cyclohexanol to 99.8 volumes of pure 95% ethyl alcohol.

Example 2

An unpotable ethyl alcohol was prepared by adding 5.0 volumes of cyclopentaone to 100 volumes of pure 95% ethyl alcohol.

Example 3

100 volumes of a denatured alcohol, prepared by adding 5 volumes of cyclohexene oxide

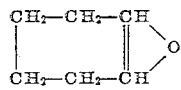

boiling range 130–135° C., to 100 volumes of pure 95% ethyl alcohol, was mixed with 140 volumes of water and 25 volumes of white oil. The mixture was well shaken and allowed to stand over night. The alcohol-water layer was then filtered through activated carbon. The filtrate had the unpotable odor and taste of the denaturant.

Example 4

100 cc. of denatured alcohol, prepared by adding 4 volumes of cyclopentanol to 100 volumes of pure 95% ethyl alcohol, was mixed with 225 cc. of saturated salt solution, 75 cc. of water and 25 cc. of white oil. The mixture was shaken 2 minutes and allowed to stand 1 hour. The alcoholic brine layer was then treated with a second 25 cc. portion of white oil. The alcoholic brine from the second extraction was mixed with 5 g. of activated carbon and shaken for 30 minutes. The mixture was filtered and treated with a second 5 g. portion of activated carbon. The filtrate from the second carbon treatment was mixed with 1 g. of sodium carbonate and 1 g. of calcium hypochlorite. This mixture was refluxed for 30 minutes and then distilled using a column of approximately 15 theoretical plates, a reflux ratio of approximately 10:1 and a draw-off rate of 1 cc. per minute. The distillate had the odor and taste of the denaturant and was unpotable.

Example 5

An unpotable denatured alcohol was prepared by adding 2 volumes of a mixture of ortho, meta and para methyl cyclohexanones to 100 volumes of 95% ethyl alcohol.

Example 6

An unpotable denatured alcohol was prepared by adding 3 volumes of a mixture of ortho, meta and para methyl cyclohexanols to 100 volumes of 95% ethyl alcohol.

Example 7

A denatured gasoline was prepared by adding 1 volume of cyclohexanone to 100 volumes of gasoline.

Example 8

A denatured ethyl propionate was prepared by adding 1 volume of cyclohexanol to 100 volumes of pure ethyl propionate.

Although not indicated in the examples above given, the materials of the present invention may be admixed with other denaturing materials, such, for example, as sulfur-containing materials, wood oil products, and other known denaturing materials. It may be desirable, from time to time, to add other denaturing materials which possess stronger and more disagreeable odors than the denaturants of the present invention as a method of distinguishing the denatured material utilized from other denatured materials or for other reasons. The denaturants of the present invention are miscible, however, with anything, generally speaking, with which ethyl alcohol is miscible and may, therefore, be utilized in conjunction with other denaturing materials generally, such as illustrated by the following additional examples which show representative, preferred mixtures.

Example 9

An unpotable alcohol was prepared by adding to 100 parts by volume of 95% ethyl alcohol two parts of cyclopentanone, two parts of a mixture of primary and secondary aliphatic higher iso alcohols and higher branched chain ketones (known under the name of "Denol"), and one part of the denaturant described and claimed in my copending application S. N. 143,295, comprising a mixture of methyl alcohol, higher branched chain ketones and saturated and unsaturated hydrocarbons.

Example 10

An unpotable alcohol of undesirable taste and distinctive odor was prepared by adding to 100 parts by volume of 95% ethyl alcohol, one part of methyl isobutyl ketone, two parts of the mixture of pyroligenous bodies, free from methanol, produced by the destructive distillation of wood, and one part of the sulfur-containing residues obtained in the refining of petroleum and known under the name of "Agdite".

Although the several examples illustrate the use of a variety of oxygenated alicyclic compounds according to this invention, other such compounds may equally as well be substituted therefor, such for example, as cyclobutanone; 1-methyl-cyclobutanol-1; 1-cyclopentenone-3; 1-methyl-cyclopentanol-2; 1-methyl-1-cyclopentenone-5; 1-cyclohexenol-3; cycloheptanol, and the like.

The proportions utilized according to the present invention may vary from a very small quantity, such as one-tenth of one per cent, up to ten per cent by volume or more of the alcohol, or other material, which is to be denatured, the amount of denaturant depending entirely upon the degree of odor and taste desired. Small quantities are, however, generally sufficient, i. e., in the range of 0.1 to 5% by volume. Although single denaturants have been disclosed, mixtures of two or more denaturants of my invention may also be utilized, if desired. A great advantage of the present denaturant resides in the fact that it does not render the denatured material commercially and scientifically undesirable inasmuch as the character of the denatured material is not changed by the incorporation of my denaturant.

Various changes may be made in the present invention without departing therefrom or sacrificing any of the advantages thereof.

I claim:

1. Denatured ethyl alcohol consisting of ethyl alcohol and from 0.1% to 5% by volume of a substance selected from the group consisting of cyclopentenone; cyclopentanol; cyclobutanone;

cycloheptanol; 1-methyl-cyclobutanol-1; 1-cyclobutenone-3; 1-methyl cyclopentanol-2; 1-methyl-1-cyclopentenone-3; and, 1-cyclohexenol-3.

2. Denatured ethyl alcohol consisting of ethyl alcohol and from 0.1% to 5% by volume of cyclopentanone.

3. Denatured ethyl alcohol consisting of ethyl alcohol and from 0.1% to 5% by volume of cyclopentanol.

4. Denatured ethyl alcohol consisting of ethyl alcohol and from 0.1% to 5% by volume of 1-methyl cyclobutanol-1.

HAMLINE M. KVALNES.